United States Patent [11] 3,620,302

[72] Inventor Robert W. Parsons
 Littleton, Colo.
[21] Appl. No. 857,565
[22] Filed Sept. 12, 1969
[45] Patented Nov. 16, 1971
[73] Assignee Marathon Oil Company
 Findlay, Ohio

[54] SEALING PERMEABLE ZONES IN SUBTERRANEAN FORMATIONS WITH HEAT-SENSITIVE SOLUTIONS
 7 Claims, No Drawings

[52] U.S. Cl. .................................................. 166/258,
 166/261, 166/288, 166/292
[51] Int. Cl. ...................................................... E21b 33/138,
 E21b 43/24
[50] Field of Search ........................................ 166/256,
 258, 261, 272, 288, 292

[56] References Cited
UNITED STATES PATENTS

| | | | |
|---|---|---|---|
| 3,454,959 | 7/1969 | Muirhead et al. | 166/288 |
| 1,379,656 | 5/1921 | Swan | 166/288 |
| 3,010,512 | 11/1961 | Hurley et al. | 166/258 |
| 3,055,423 | 9/1962 | Parker | 166/261 X |
| 3,070,159 | 12/1962 | Marx | 166/261 |
| 3,121,462 | 2/1964 | Martin et al. | 166/288 |
| 3,198,249 | 8/1965 | Willman | 166/261 X |
| 3,205,946 | 9/1965 | Prats et al. | 166/288 |
| 3,259,189 | 7/1966 | Darley | 166/292 |
| 3,261,400 | 7/1966 | Elfrink | 166/292 |

OTHER REFERENCES

Snell, Foster D., et al. " Dictionary of Commercial Chemicals." Princeton, Van Nostrand, 3D. Ed., 1962, pp. 48 and 49.

Primary Examiner—Ian A. Calvert
Attorneys—Joseph C. Herring, Richard C. Willson, Jr. and Jack L. Hummel ABSTRACT: The permeability of permeable zones in a subterranean formation is reduced by injecting into the formation an aqueous solution containing plugging agents which swell or foam when heated, and then heating these agents to a temperature sufficient to cause them to intumesce. Examples of useful plugging agents include soluble metal silicates. The reservoir can be heated by any of several means, e.g. a standard downhole heater, igniting charcoal briquettes, or with heat generated by in-situ combustion process, e.g. in-situ combustion process can be maintained in a zone adjacent to the permeable zone to be sealed.

SEALING PERMEABLE ZONES IN SUBTERRANEAN FORMATIONS WITH HEAT-SENSITIVE SOLUTIONS

BACKGROUND OF THE INVENTION

U.S. Pat. No. 2,807,324 to King et al. teaches a plugging method wherein an oil-insoluble aqueous solution containing ferrous sulfate is brought into contact with an oil-insoluble aqueous solution of an alkali metal silicate to form a precipitate of ferrous hydroxide and silica gel.

U.S. Pat. No. 3,390,723 to Hower et al. discloses a plugging solution comprising an "aqueous sodium silicate solution" to which a water-soluble gum such as galactomannan is added to produce a "stiff, jellylike mass."

U.S. Pat. No. 3,366,177 to Powers et al. teaches a method for consolidating loose sands wherein a cement clinker is treated with potassium and sodium silicates, or with liquid porcelain.

In the U.S. Pat. No. 3,070,159 to Marx an aqueous solution of a water-soluble alkali metal silicate is used to seal an incompetent tar-sand formation surrounding a well.

Until now, the art has not discovered the advantage of using conventional types of reservoir heating to effect the reduction of permeability of permeable formations in subterranean oil-containing formations.

DESCRIPTION OF THE INVENTION

It is desirable to reduce the permeability of permeable zones in subterranean formations so that recovery methods are not impaired by recovery fluids being "theived" into such permeable zones and so that fluids in these permeable strata do not contaminate the desired recoverable fluids. This invention comprises injecting an aqueous plugging solution into a permeable formation and then heating the solution by means known to the art, e.g. by in-situ combustion in porous media adjacent the permeable zone. The zone may be plugged substantially concurrently with the movement of the combustion front.

Useful plugging agents include the water soluble metal silicates, especially the alkali metal silicates, such as sodium silicate, potassium silicate, lithium silicate, rubidium silicate, cesium silicate, and francium silicate. Sodium silicates and potassium silicates, and mixtures thereof are preferred plugging agents. Also, sodium or potassium orthosilicates, disilicates, metasilicates, or even sodium or potassium sesquisilicates may be used. Examples of useful sodium silicates include those identified as waterglass and liquid porcelain or liquid glass, these terms defined in Foster D. Snell's *Dictionary of Commercial Chemicals*, Princeton, Van Nostrand, 3rd Ed., 1962, pp. 58 and 49.

Aqueous solutions of water-soluble metal silicates can contain from less than about 3 percent to about 65 percent silicates by weight, but preferably these silicates should range from about 10 percent to about 50 percent weight and most preferably from about 15 percent to about 40 percent by weight of solution.

Any convenient and efficient means for heating the solutions may be employed. The solutions must be heated to temperatures sufficient to cause the agents within the solution to intumesce, i.e. to enlarge or expand with heat such as swelling or bubbling, or foaming. Known heat-producing means in the wellbore such as a standard downhole heater, igniting charcoal briquettes, or heating up the solution by in situ combustion are all appropriate. Various types of in situ combustion techniques, forward, reverse, etc. are useful with the invention. As the examples illustrate, temperatures in excess of 120° F. are sufficient to cause the sodium silicate to intumesce. Temperatures in the range of 450°–800°X F. are usually sufficient to achieve the desired swelling and sealing of the plugging agents, but temperatures in excess of 600° F. are suggested, a range of 650°–750° F. being most preferable under most reservoir condition. In actual practice, the amount of aqueous plugging solution utilized will vary from well to well in accordance with the depth and type of the well, and the particular nature of the reservoir. In most circumstances, however from about 5 to about 65 barrels of aqueous plugging solution per vertical foot of permeable zone will be sufficient to accomplish the objectives of the invention. Preferably, from about 15 to about 35 barrels per vertical foot of permeable zone will be sufficient to seal the permeable rock.

Preferred embodiments of the invention are taught in the following Example.

EXAMPLE

Four Berea sandstone cores are treated in accordance with the practices of the invention. Table 1 presents this data. Before treatment the samples are weighed and the permeability to air is measured. Then, the core plugs are saturated with Sauereisen No. 14 thinning liquid. Sauereisen is the trademark owned by Sauereisen Company, Pittsburgh, Pennsylvania, and identifies an aqueous inorganic silicate solution. Saturation is accomplished by immersing the plugs in a beaker of the solution and then placing them in a vacuum chamber. The amount of liquid invading the core plugs is indicated by the weight change (see table 1).

The different temperature and time treatments given the cores are outlined in table 1. The weight and air permeabilities of the core plugs after the respective heat treatments, as shown in table 1, demonstrate a complete plugging of three of the samples (i.e. A, B, and C) heated substantially above room temperature. Samples dried at room conditions until no further weight change was noticed also showed a substantial decrease.

TABLE 1

| | Before Treatment of Core | | After liquid saturation | | | After heat treatment | | |
|---|---|---|---|---|---|---|---|---|
| | Permeability of core (md.) | Weight (grams) | Weight of core (grams) | Weight of liquid (grams) | Heat treatment | Weight of core (grams) | Weight increase over original | Permeability (md.) |
| Sample No.: | | | | | | | | |
| A | 570 | 53.28 | 59.72 | 6.44 | 156° F. for 20 hours 57 minutes | 57.15 | 3.87 | 0 |
| B | 388 | 52.34 | 58.67 | 6.33 | 220° F. for 6 hours 45 minutes | 55.94 | 3.60 | 0 |
| C | 526 | 52.54 | 59.77 | 7.33 | 120° F. for 7 hours 10 minutes | 58.27 | 5.73 | 0 |
| D | 321 | 52.81 | 59.33 | 6.52 | 72–73° F. for 36 days | 55.53 | 2.72 | 32 |

The invention is capable of a variety of modifications and variations which may become apparent to those skilled in the art by a reading of the specification and appended claims. Such modifications are intended to be included within the scope of the invention as defined in the specification and appended claims.

What is claimed is:

1. A process for substantially plugging a permeable zone adjacent to a less permeable zone in subterranean formations comprising (1) injecting an aqueous solution containing an inorganic silicate into the permeable zone, (2) generating in situ combustion in the less permeable zone adjacent said permeable zone; and (3) sustaining said in situ combustion in the less permeable zone until sufficient heat is transferred to the permeable zone to cause the inorganic silicate to intumesce resulting in sealing the permeable zone.

2. The process of claim 1 wherein the inorganic silicate is sodium silicate.

3. The process of claim 1 wherein the inorganic silicate is potassium silicate.

4. The process of claim 1 wherein the inorganic silicate is a mixture of sodium and potassium silicate.

5. The process of claim 1 wherein the aqueous solution is heated to a temperature of at least about 450° F.

6. The process of claim 1 wherein the aqueous solution is heated to a temperature of about 650° F.

7. The process of claim 1 wherein the aqueous solution contains from about 10 percent to about 50 percent by weight of silicate.

* * * * *

UNITED STATES PATENT OFFICE
CERTIFICATE OF CORRECTION

Patent No. 3,620,302      Dated 11/16/71

Inventor(s) Robert W. Parsons

It is certified that error appears in the above-identified patent and that said Letters Patent are hereby corrected as shown below:

| | |
|---|---|
| Col. 1, line 30: | Delete "theived" and insert --thieved--. |
| Col. 1, line 64: | Delete "58" and insert --48--. |
| Col. 1, line 68: | After "50%" insert --by--. |
| Col. 2, line 7: | After "800°" delete "X". |

Signed and sealed this 6th day of June 1972.

(SEAL)
Attest:

EDWARD M. FLETCHER, JR.
Attesting Officer

ROBERT GOTTSCHALK
Commissioner of Patents